United States Patent [19]
Yamane et al.

[11] Patent Number: 6,015,246
[45] Date of Patent: *Jan. 18, 2000

[54] TRANSPARENT PNEUMATIC TUBE CARRIER WITH TRANSPARENT ELASTIC HOLDING FILMS

[75] Inventors: Kiyoshi Yamane; Shigeru Kiriyama; Shizuo Higuchi, all of Miyagi, Japan

[73] Assignee: Nippon Shooter Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/712,475

[22] Filed: Sep. 11, 1996

[30] Foreign Application Priority Data

Sep. 12, 1995 [JP] Japan ................................. 7-259273

[51] Int. Cl.⁷ .................................................. B65G 51/06
[52] U.S. Cl. ........................... 406/184; 406/186; 406/189
[58] Field of Search .................................. 406/184, 185, 406/186, 187, 188, 189, 190

[56] References Cited

U.S. PATENT DOCUMENTS

| | | | |
|---|---|---|---|
| 1,638,047 | 8/1927 | MacLaren | 406/187 X |
| 3,072,362 | 1/1963 | Allen | 406/188 |
| 4,324,511 | 4/1982 | Irish | 406/189 |

*Primary Examiner*—Andrew C. Pike
*Attorney, Agent, or Firm*—Fish & Richardson P.C.

[57] ABSTRACT

A pneumatic tube carrier which is pneumatically conveyed through a pneumatic tube is provided with a container body for carrying articles and a pair of elastic films provided in the container body with their peripheries held by the same. The pair of elastic films are stretched by the article disposed therebetween and hold the article by a shrinking force generated therein.

12 Claims, 9 Drawing Sheets

TRANSPARENT PNEUMATIC TUBE CARRIER WITH TRANSPARENT ELASTIC HOLDING FILMS

BACKGROUND OF THE INVENTION

1. Field of the Invention

The present invention relates to a pneumatic tube carrier used for a pneumatic tube conveyor system, and more particularly to a pneumatic tube carrier able to carry one or more articles of various shapes and sizes while protecting them from shock.

2. Prior Art

Widely known in the past has been a pneumatic tube conveyor system which conveys pneumatic tube carriers carrying one or more articles through a pneumatic transport tube by air pressure. When conveying articles susceptible to shock carried in the pneumatic tube carrier, the general practice has been to protect the articles from shock by wrapping the article with a cushioning sheet or using a cushioning inner case prepared in advance to match the shape of the article (for example, see Japanese Unexamined Utility Model Publication (Kokai) No. 60–6719).

When wrapping an article by a cushioning sheet, however, since a sufficient shock resistance cannot be obtained when the wrapped article freely moves inside the pneumatic tube carrier, it is necessary to carefully wrap it so that there is no clearance between the wrapped article and the inside surface of the pneumatic tube carrier. Further, when the article has a complicated shape, the shape after the article is wrapped by the sheet also becomes complicated, so it becomes difficult to affix it inside the pneumatic tube carrier.

On the other hand, when using a previously prepared inner case, the shape of the article which can be carried in the inner case is limited, so it is not possible to carry articles of different shapes. Further, inner cases made in various different shapes become necessary for conveying articles of different shapes, so the economic burden increases and storage of the inner cases, etc. becomes troublesome.

SUMMARY OF THE INVENTION

Therefore, an object of the present invention is to provide a pneumatic tube carrier which can easily carry one or more articles of various shapes and sizes and can convey the articles through a pneumatic tube while protecting them from shock.

According to the present invention, the above mentioned object can be achieved by a pneumatic tube carrier for carrying one or more articles therein and conveying them through a pneumatic tube, characterized by being provided with a container body for containing therein one or more articles and a pair of elastic films provided in the container body with their peripheries held by the container body, the pair of elastic films being adapted to be stretched by the articles disposed therebetween.

In the pneumatic tube carrier having the above configuration, when the articles are disposed between the pair of elastic films which are held by the container body at the periphery thereof, the pair of elastic films are stretched by the articles and generate a shrinking force therein, and thus the articles can be held by a pressing force caused by the shrinking force of the pair of elastic films at a position where an equilibrium of the pressing force is held. Accordingly, it is possible to stably hold the articles of various shapes or sizes in the container body away from the inside surfaces of the container body. Further, since the vibration and shock given to the container body are attenuated by the pair of elastic films, it is possible to convey articles of various shapes or sizes carried in the container while effectively protecting them from shock by the pair of elastic films.

The container body of the above pneumatic tube carrier may be comprised of a first outer shell having an opening and a second outer shell having an opening matching with the opening of the first outer shell, the pair of elastic films being affixed at peripheries thereof to the pair of outer shells around the openings, respectively. The first and second outer shells may be pivotally connected to each other at one side of the openings for open and close movement thereof. According to this constitution of the container body, it is possible to fabricate the pneumatic tube carrier by the minimum number of parts and possible to manufacture it inexpensively.

On the other hand, the pair of elastic films may be affixed at peripheries thereof to a pair of frames, respectively, which are attached in a detachable manner at predetermined positions in the container body. According to this constitution, it is possible to easily and inexpensively replace the elastic films together with the frames when the films deteriorate, break, etc.

In the pneumatic tube carrier having the above elastic films affixed to the frames, the container body may be comprised of a first shell having an opening and a second outer shell having an opening matching with the opening of the first outer shell, the first and second outer shells being provided with holders for holding the pair of frames at the openings. According to this constitution of the container body, it is possible to easily attach and detach the pair of frames to and from the first and second outer shells.

Preferably, at least parts of the container body and the elastic films are transparent or semitransparent. According to this constitution of the container body and the elastic films, it is possible to easily confirm from the outside of the container body the article held in the container body by the pair of elastic films.

Preferably, the pneumatic tube carrier further comprises an inner case which is detachably carried in the container body, the inner case being comprised of a first inner shell having an opening and a second inner shell having an opening matching with the opening of the first inner shell, the pair of elastic films being attached at their peripheries to the first and second inner shells around the openings, respectively. The first and second inner shells may be pivotally connected to each other at one side of the openings for open and close movement thereof.

In the pneumatic tube carrier having the inner case of the above constitution, it is possible to easily hold articles having various shapes and/or sizes inside the inner case by the pair of elastic films and is also possible to effectively protect the articles from shock. Further, it is possible to easily and inexpensively replace the elastic films together with the inner case when the elastic films deteriorate, break, etc.

Preferably, in the pneumatic tube carrier having the inner case of the above constitution, at least parts of the container body, inner case, and elastic films are transparent or semitransparent. In this constitution of the pneumatic tube carrier, it is possible to easily confirm from the outside of the container body the articles held by the pair of elastic films inside the inner case inside the container body.

According to another aspect of the invention, the above mentioned object can be achieved by a pneumatic tube carrier for containing one or more articles therein and conveying them through a pneumatic tube, characterized by being provided with a container body for containing one or more articles therein and an elastic film which is provided in the container body with its periphery held by the same to separate an interior of the container body into two spaces.

In the pneumatic tube carrier having the above constitution, when one or more articles are placed within one of the spaces in the container body, the elastic film is stretched by the articles and generates a shrinking force to press the articles against the inside of the container body. Therefore, according to the pneumatic tube carrier having the above constitution, it is possible to easily affix and hold articles of various shapes or sizes in the container body by the elastic film. Also, a pressing force caused by the shrinking force of the elastic film stretched by the articles acts on the articles in one of the spaces in the container body to maintain equilibrium, so it is possible to convey articles of various shapes or sizes carried in the container body while effectively protecting them from shock by the elastic film.

Preferably, the container body of the above pneumatic tube carrier is comprised of a first outer shell having an opening and a second outer shell having an opening matching with the first outer shell, the elastic film being attached at a periphery thereof to one of the first and second outer shells to seal one of the openings. The first and second outer shells may be pivotally connected to each other at one side of the openings for open and close movement thereof.

In the pneumatic tube carrier having the above constitution, since the periphery of the elastic film is attached to one of the first and second outer shells so as to seal one of the openings, it is possible to fabricate the pneumatic tube carrier by the minimum number of parts and possible to manufacture it inexpensively.

Preferably, at least parts of the outer shells and the elastic film are transparent or semitransparent. According to this constitution, it is possible to easily confirm from the outside of the shells the article held within the shells by the elastic film.

DETAILED DESCRIPTION OF THE PREFERRED EMBODIMENTS

Figure 1:
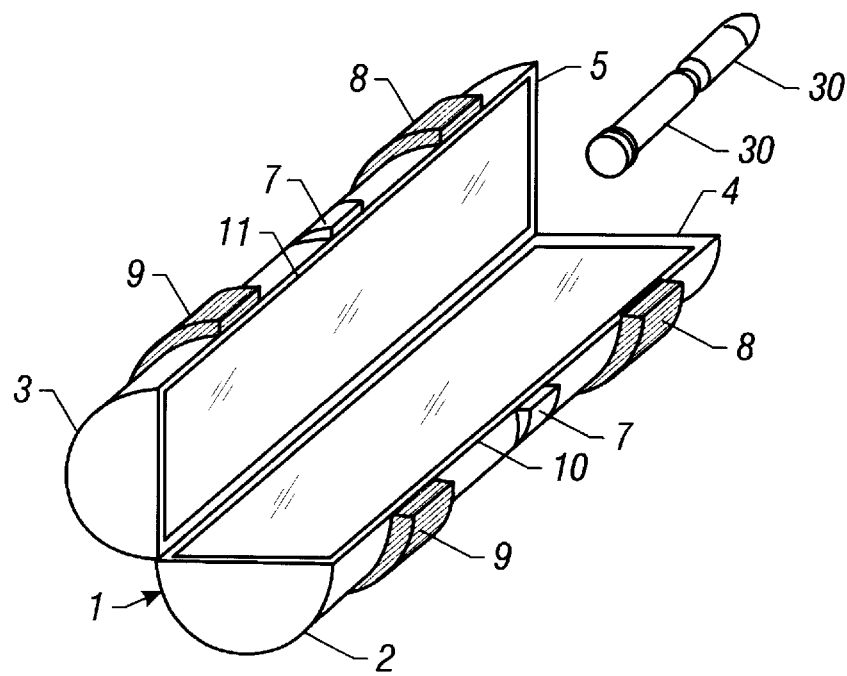
FIG. 1 is a perspective view of a pneumatic tube carrier showing a first embodiment of the present invention in a state with the pair of outer shells of the container body opened.
Figure 2:
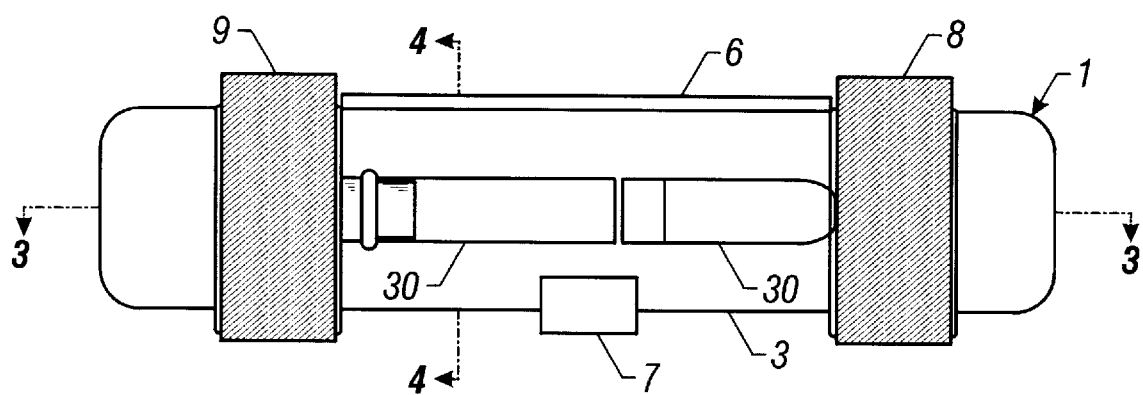
FIG. 2 is a plan view showing the state of an article carried in the container body of the pneumatic tube carrier shown in FIG. 1.
Figure 3:
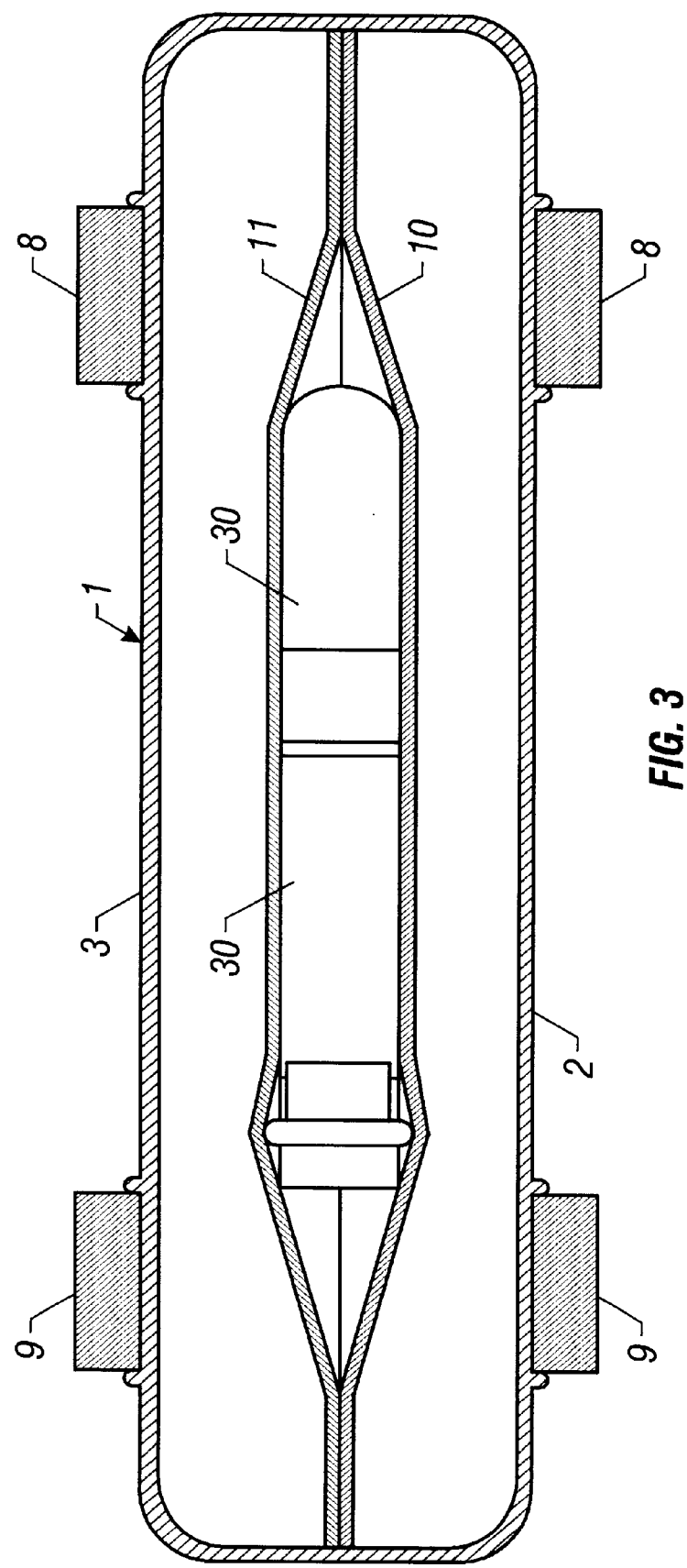
FIG. 3 is a longitudinal cross-sectional view of the pneumatic tube carrier shown in FIG. 1 along the line 3—3 in FIG. 2.
Figure 4:
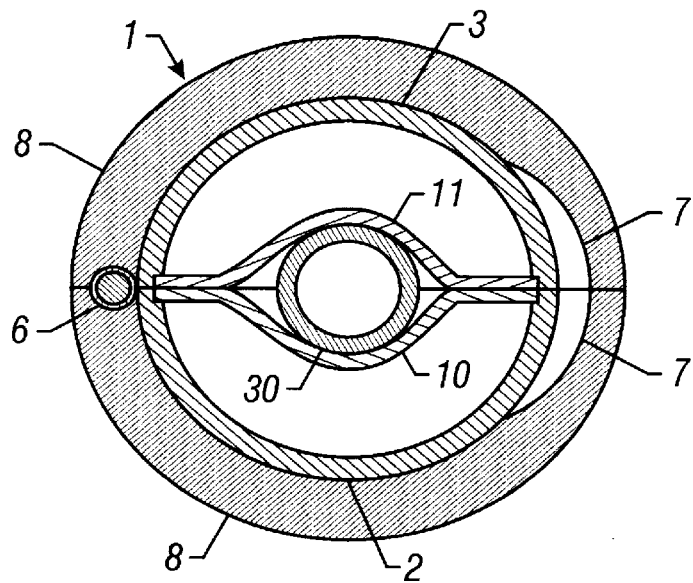
FIG. 4 is a cross-sectional view of the pneumatic tube carrier shown in FIG. 1 along the line 4—4 in FIG. 2.

Preferred embodiments of the invention will now be explained in detail with reference to the drawings.

Referring to FIGS. 1 to 4 which show a first embodiment of the present invention, the pneumatic tube carrier carrying one or more articles and adapted to be pneumatically conveyed through a pneumatic tube (not shown) is provided with a substantially cylindrical container body 1 which is comprised of a first outer shell 2 and a second outer shell 3. The first outer shell 2 and the second outer shell 3 have shapes corresponding to that of the container body 1 split longitudinally into two pieces. The first outer shell 2 and the second outer shell 3 have rectangular openings 4 and 5 which match with each other. The second outer shell 3 is pivotally attached in an openable and closable manner to one side of the opening 4 of the first outer shell 2 through a hinge 6 (see FIG. 2 and FIG. 4). As shown schematically in FIG. 1, at the sides of the first outer shell 2 and the second outer shell 3 opposite to the side of the hinge 6 is provided a latch 7 for engaging the second outer shell 3 to the first outer shell 2 at a closed position. Further, at the outer circumferences near the two ends of the first outer shell 2 and the second outer shell 3 are attached, in a manner surrounding the outer circumference of the container body 1, sliding rings 8 and 9 comprised of for example felt, woven fabric, a slippery plastic, etc. to improve the airtightness of the container body 1 and the inner circumferential surface of the pneumatic tube (not shown).

A pair of elastic films 10 and 11 are provided in the container body 1 with their peripheries held in the container body 1. More specifically, in the first embodiment, one elastic film 10 is affixed to the sides of the opening 4 of the first outer shell 2 so as to cover the opening 4, while the other elastic film 11 is affixed to the sides of the opening 5 of the second outer shell 3 so as to cover the opening 5. As the elastic films 10 and 11, use may be made of for example a polyethylene film, polyurethane film, etc. or an elastic woven fabric, net, etc.

Since the pair of elastic films 10 and 11 are affixed at their peripheries to the openings 4 and 5 of the first outer shell 2 and the second outer shell 3, when one or more articles 30 are placed between the two elastic films 10 and 11 and the second outer shell 3 is closed against the first outer shell 2, the peripheries of the two elastic films 10 and 11 come into close contact and the portions coming into contact with the articles 30 are stretched by the articles 30 to generate a shrinking force, which shrinking force gives rise to a pressing force which grips the articles 30. Accordingly, the articles 30 are stably held at an equilibrium position by the pressing force caused by the shrinking force of the two elastic films 10 and 11 away from the inside surface of the container body 1. Accordingly, not only is it possible to prevent collision of the articles 30 and the container body 1 by movement of the articles 30 inside the container body 1, but it is also possible to effectively attenuate by the two elastic films 10 and 11 the vibration or shock given to the container body 1, so even when any of the articles 30 carried in the container body 1 is a specimen carried in a fragile glass or other container, a precision part, a measuring device, etc., it is possible to protect the article from vibration or shock and convey it through the pneumatic tube safely and at a high speed.

Further, even when the shape, size, or number of the articles 30 differs, it is possible to easily and stably hold the articles 30 by the pair of elastic films 10 and 11 and to protect them from shock, so it becomes possible to use the pneumatic tube carrier for the conveyance of articles of various shapes—making it superior in terms of general usability. Further, since it is possible to carry and convey articles 30 of various shapes and sizes in the container body 1, it would be convenient if it were possible to be able to easily distinguish visually from the outside the articles 30 carried in the container body 1. Accordingly, it is preferable that the container body 1 and the pair of elastic films 10 and 11 be made at least partially transparent or semitransparent. Accordingly, the container body 1 is preferably made from a transparent or semitransparent plastic, for example, a polycarbonate, nylon, etc.

In the pneumatic tube carrier of the above configuration, since the openings 4 and 5 of the first and second outer shells 2 and 3 are covered by the elastic films 10 and 11, when the elastic films 10 and 11 are extremely impermeable, it is preferable to form ventilation holes in the elastic films 10 and 11 or the first and second outer shells 2 and 3 so as to allow the air inside the first and second outer shells 2 and 3 compressed when carrying the articles 30 to escape.

Note that the first and second outer shells 2 and 3 in the above embodiment define inside them a single article carrying space, but it is possible to divide the inside of the first and second outer shells 2 and 3 into a plurality of article carrying chambers by partitions (not shown).

Figure 5:
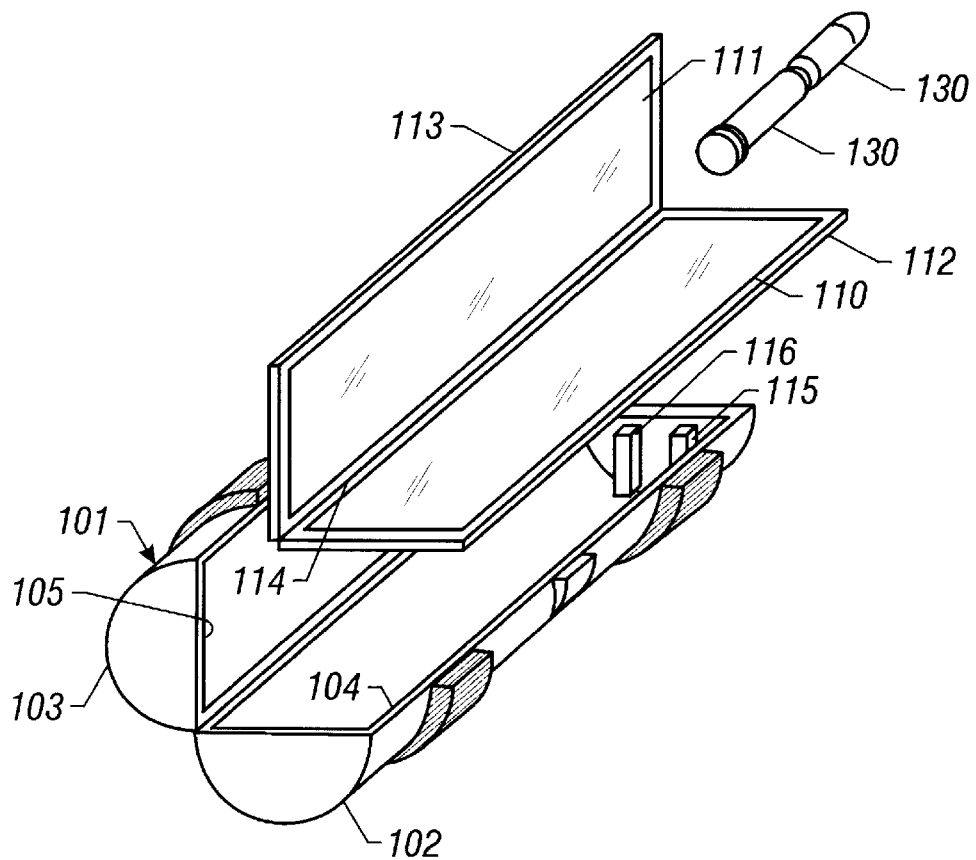
FIG. 5 is a perspective view of a pneumatic tube carrier showing a second embodiment of the present invention in a state with the outer shells of the container body and the pair of frames opened.
Figure 6:
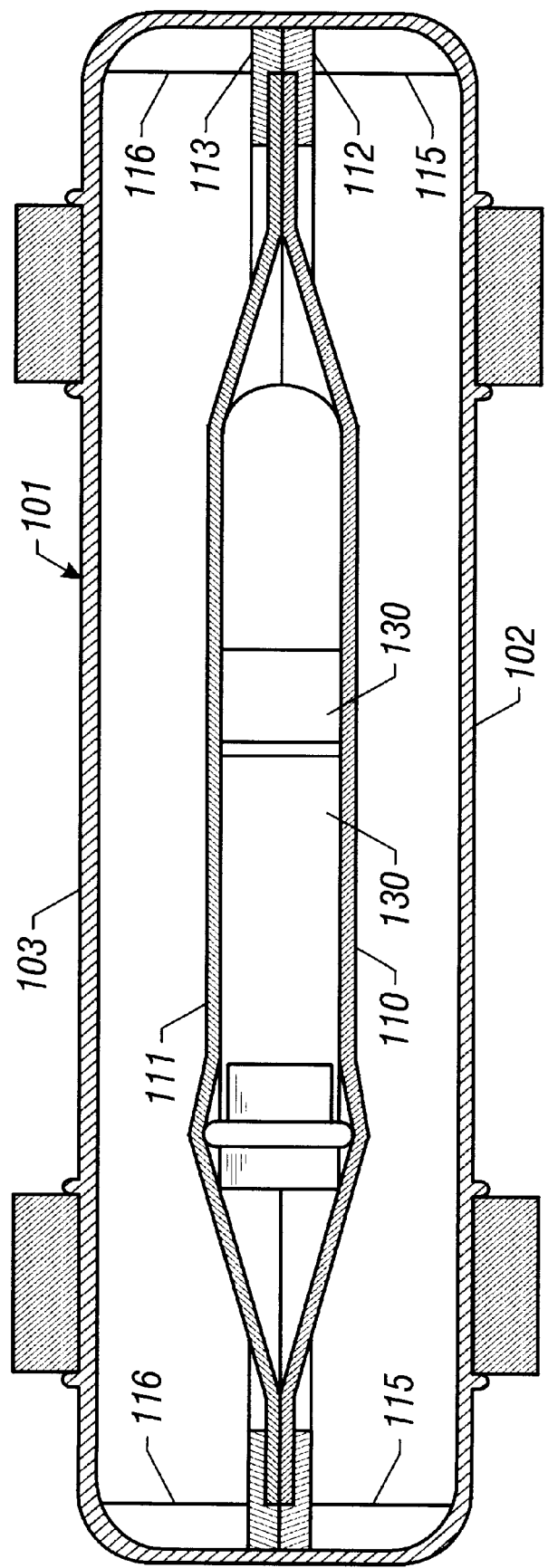
FIG. 6 is a longitudinal cross-sectional view similar to FIG. 3 of the pneumatic tube carrier shown in FIG. 5.

FIGS. 5 and 6 show a second embodiment of the present invention. In these Figures, the component parts similar to those of the first embodiment are denoted by reference numerals which are respectively given by adding one hundred to the same numerals as the reference numerals used in the first embodiment.

Referring to FIG. 5 and FIG. 6, the pneumatic tube carrier of the second embodiment is characterized in that the peripheries of the pair of elastic films 110 and 111 are affixed to the pair of frames 112 and 113 which are attached detachably to predetermined positions in the container body 101. The pair of frames 112 and 113 may be separate from each other, but preferably they are connected in an openable and closable manner through a hinge 114 provided at the sides of the frames 112 and 113. The hinge 114 may have a pivot shaft (not shown) connecting the frames 112 and 113 in a pivotable manner, but may also be configured by a thin connecting piece have flexibility integral with the frames 112 and 113.

In the second embodiment, the container body 101, like in the first embodiment, is comprised of a first outer shell 102 having an opening 104 and a second outer shell 103 having an opening 105 matching with the opening 104 of the first outer shell 102, the second outer shell 103 is pivotally attached in an openable and closable manner to one side of the opening 104 of the first outer shell 102 through the hinge (not shown), and holders 115 and 116 for holding the pair of frames 112 and 113 are provided at the openings 104 and 105 of the first and second outer shells 102 and 103, respectively.

Accordingly, in the pneumatic tube carrier of the second embodiment, since the pair of frames 112 and 113 affixing the peripheries of the elastic films 110 and 111 are attached in a detachable manner at predetermined positions in the container body 101, like with the first embodiment, it is possible to easily hold in the container body 101 articles 130 of various shapes and/or sizes by the pair of elastic films 110 and 111 and also possible to convey the articles 130 through a pneumatic tube while effectively protecting it from vibration or shock. Further, there is no need to replace the container body 101 when the elastic films 110 and 111 deteriorate, break, etc. It is possible to easily and inexpensively replace the elastic films 110 and 111 together with the frames 112 and 113.

Further, in the pneumatic tube carrier of the above second embodiment, since holders 115 and 116 for holding the pair of frames 112 and 113 are provided at the openings 104 and 105 of the first and second outer shells 102 and 103, it is possible to easily attach and detach the pair of frames 112 and 113 to and from the first and second outer shells 102 and 103.

In the second embodiment as well, at least parts of the container body 101 and the elastic films 110 and 111 are preferably made transparent or semitransparent.

Figure 7:
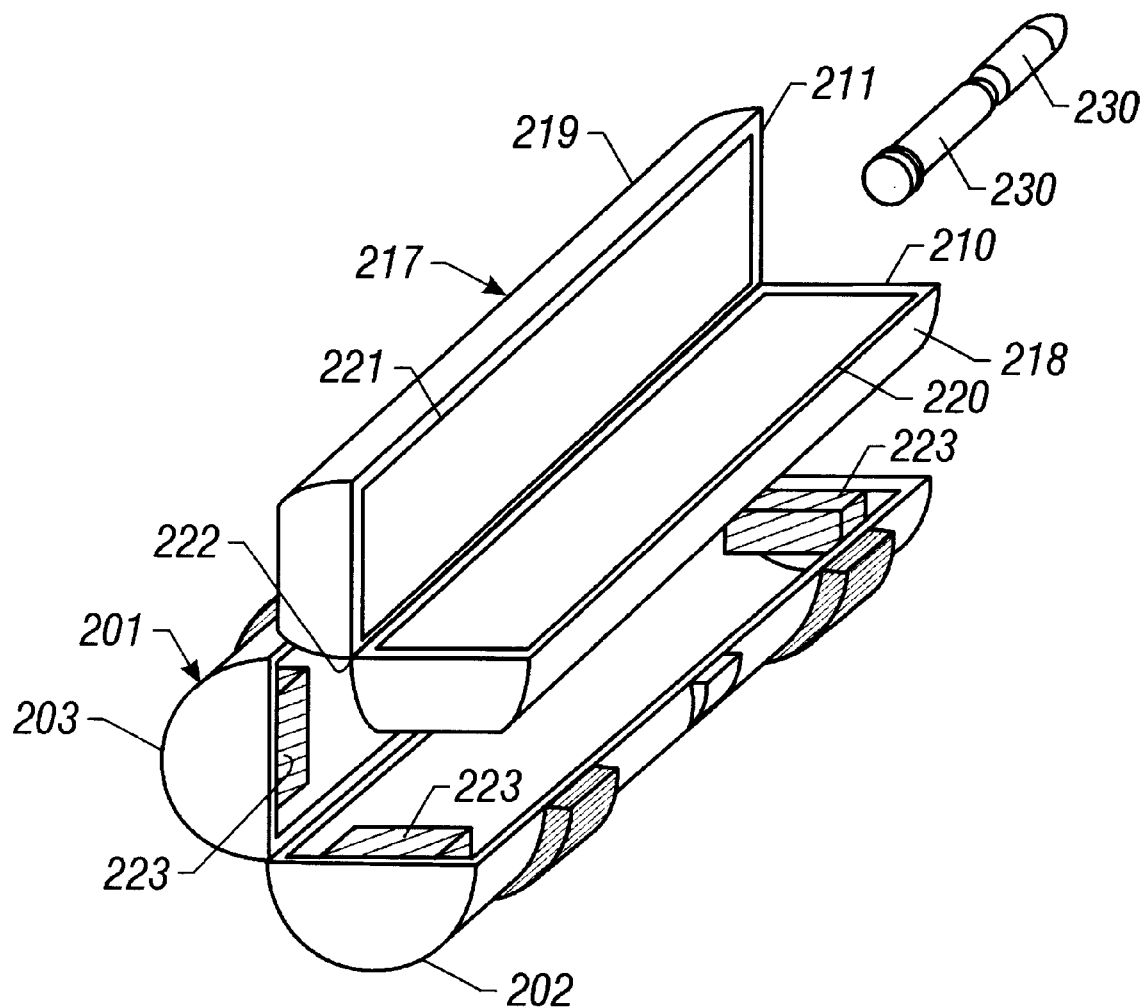
FIG. 7 is a perspective view of a pneumatic tube carrier showing a third embodiment of the present invention in a state with the pair of outer shells of the container body and the pair of inner shells of the inner case opened.
Figure 8:
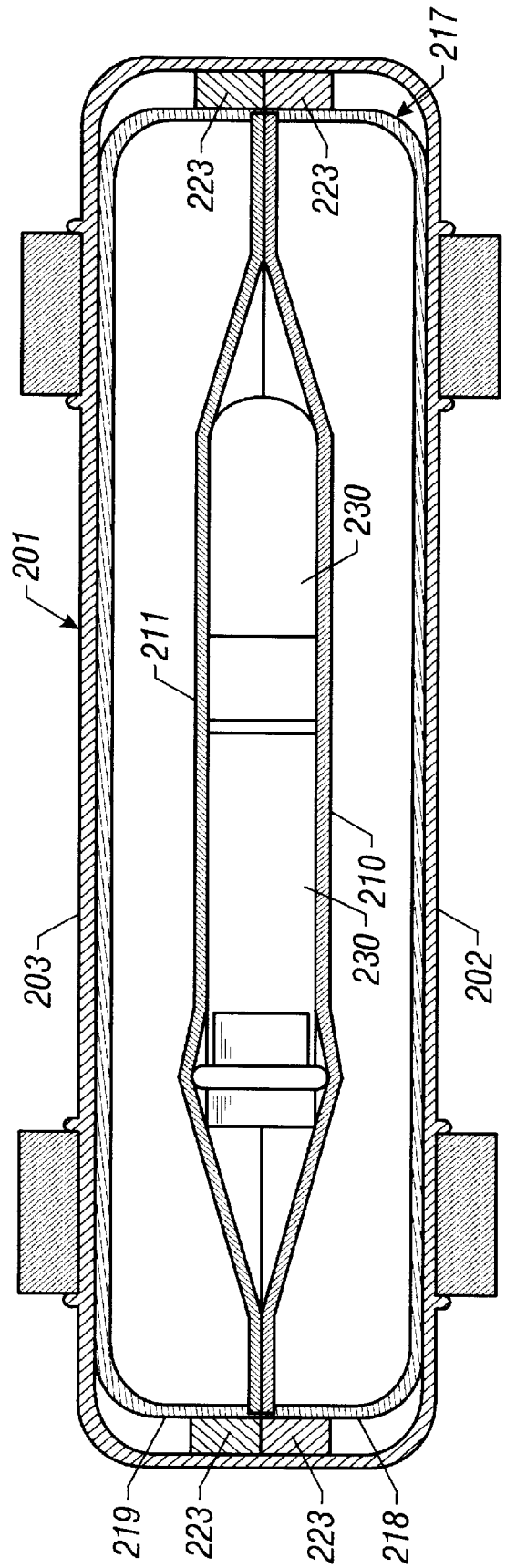
FIG. 8 is a longitudinal cross-sectional view similar to FIG. 3 of the pneumatic tube carrier shown in FIG. 7.

FIGS. 7 and 8 show a third embodiment of the present invention. In these Figures, the component parts similar to those of the first embodiment are denoted by reference numerals which are respectively given by adding two hundred to the same numerals as the reference numerals used in the first embodiment.

Referring to FIGS. 7 and 8, the pneumatic tube carrier of the third embodiment is provided with an inner case 217 contained in the container body 201. The inner case 217 is comprised of a first inner shell 218 having an opening 220 and a second inner shell 219 having an opening 221 matching with the opening 220 of the first inner shell 218. Further, a pair of elastic films 210 and 211 are attached to the opening 220 of the first inner shell 218 and the opening 221 of the inner shell 219 of the inner case 217. The first and second inner shells 218 and 219 may be separate from each other, but preferably they are connected in an openable and closable manner through a hinge 222 provided at the sides of the first and second inner shells 218 and 219. The hinge 222 may have a pivot shaft (not shown) connecting the first and second inner shells 218 and 219 in a pivotable manner, but may also be configured by a thin connecting piece have flexibility integral with the first inner shell 218 and second inner shell 219.

In the pneumatic tube carrier of the third embodiment, it is possible to easily hold articles 230 of various shapes and/or sizes by the pair of elastic films 210 and 211 in the inner case 217 and also possible to effectively protect the articles 230 from shock. Further, there is no need to replace the container body 201 when the elastic films 210 and 211 deteriorate, break, etc. It is possible to easily and inexpensively replace the elastic films 210 and 211 together with the inner case 217.

To enable easy confirmation from the outside of the container body 201 of the article 230 held by the pair of elastic films 210 and 211 in the inner case 217, it is preferable that the container body 201, inner case 217, and elastic films 210 and 211 be at least partially transparent or semitransparent. Accordingly, the container body 201 is preferably made by a transparent or semitransparent plastic such as a polycarbonate and the inner case 217 is preferably made by a transparent or semitransparent polystyrene, etc.

Further, it is preferable to attach a cushioning member 223 for protecting the inner case 217 from shock at suitable locations on the inside surface of the container body 201, for example, on the inside surface of the two ends of the first and second outer shells 202 and 203 in the longitudinal direction.

Further, the inside of the inner case 217 may be divided into a plurality of article carrying chambers by partitions (not shown) or a plurality of inner cases 217 may be carried in the container body 201.

Figure 9:
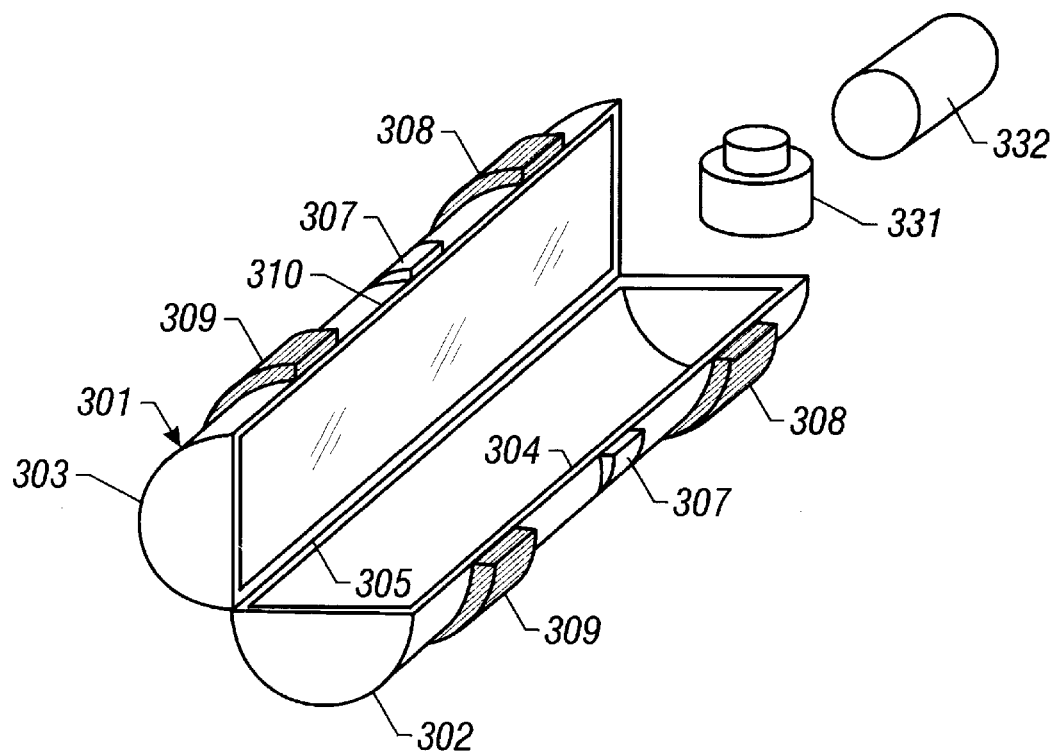
FIG. 9 is a perspective view of a pneumatic tube carrier showing a fourth embodiment of the present invention in a state with the pair of outer shells of the container body opened.
Figure 10:
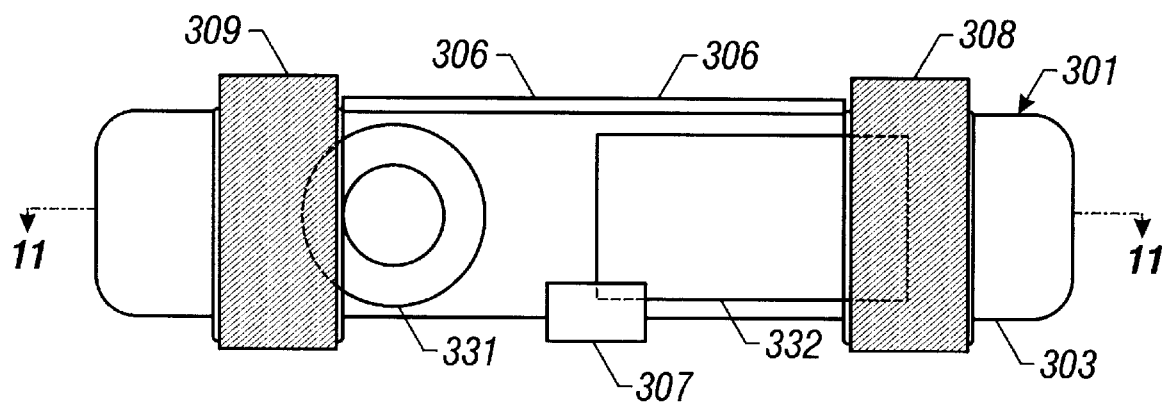
FIG. 10 is a plan view of the pneumatic tube carrier shown in FIG. 9.
Figure 11:
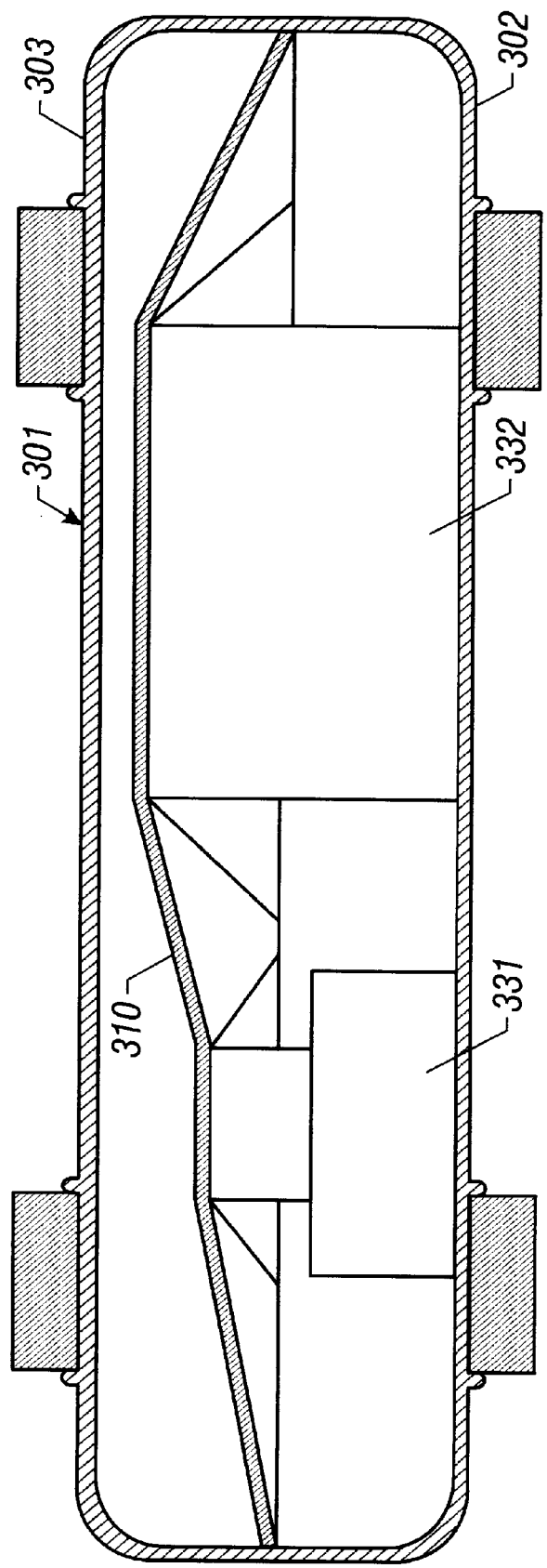
FIG. 11 is a longitudinal cross-sectional view of the pneumatic tube carrier shown in FIG. 9 along the line 11—11 in FIG. 10.

FIGS. 9 through 11 show a fourth embodiment of the present invention. In these Figures, the component parts similar to those of the first embodiment are denoted by reference numerals which are respectively given by adding three hundred to the same numerals as the reference numerals used in the first embodiment.

Referring to FIGS. 9 through 11, the pneumatic tube carrier of the fourth embodiment is characterized in that it is provided with a container body 301 for carrying one or more articles and an elastic film 310 provided in the container body 301 with its periphery held by the same so as to separate the interior of the container body 301 into two spaces and in that the elastic film 310 is adapted to be stretched by articles 331 and 332 disposed in one of the spaces in the container body 301 so as to press the articles 331 and 332 against the inside surface of the container body 301.

The container body 301 in the fourth embodiment is comprised of a first outer shell 302 having an opening 304 and a second outer shell 303 having an opening 305 matching with the opening 304 of the first outer shell 302. The periphery of the elastic film 310 is attached to the opening 305 of the second outer shell 303. While not illustrated, the elastic film 310 may be attached to the opening 304 of the first outer shell 302 as well. Further, the first and second outer shells 302 and 303 may be separate from each other, but preferably the second outer shell 303 is pivotally attached in an openable and closable manner to one side of the opening 304 of the first outer shell 302 through a hinge 306 (see FIG. 10). The container body 301 and the elastic film 310 preferably are made at least partially transparent or semitransparent.

In the fourth embodiment, since the elastic film 310 provided in the container body 301 with its periphery held by the same is stretched by the contact with the articles 331 and 332 carried in the container body 301 and generates a shrinking force and that shrinking force gives rise to a pressing force which presses the articles 331 and 332 against the inside of the container body 301, it is possible to easily affix and hold in the container body 301 articles of various shapes and sizes by the elastic film 310. Further, since the pressing force caused by the shrinking force of the elastic film 310 stretched by contact with the articles 331 and 332 acts to maintain equilibrium in the articles 331 and 332 in the container body 301, it is possible to convey articles of various shapes and/or sizes carried in the container body 301 while effectively protecting them against shock by the elastic film 310.

Further, in the fourth embodiment, since the periphery of the elastic film 310 is attached to the opening of one of the first and second outer shells 302 and 303, it is possible to make the pneumatic tube carrier with the minimum number of parts and to manufacture it inexpensively.

Note that while not illustrated, as a modification of the fourth embodiment, it is possible to attach the periphery of the elastic film 310 to a frame attached detachably in the container body 301 or to one of a pair of inner shells of an inner case such as shown in FIG. 7.

Figure 12:
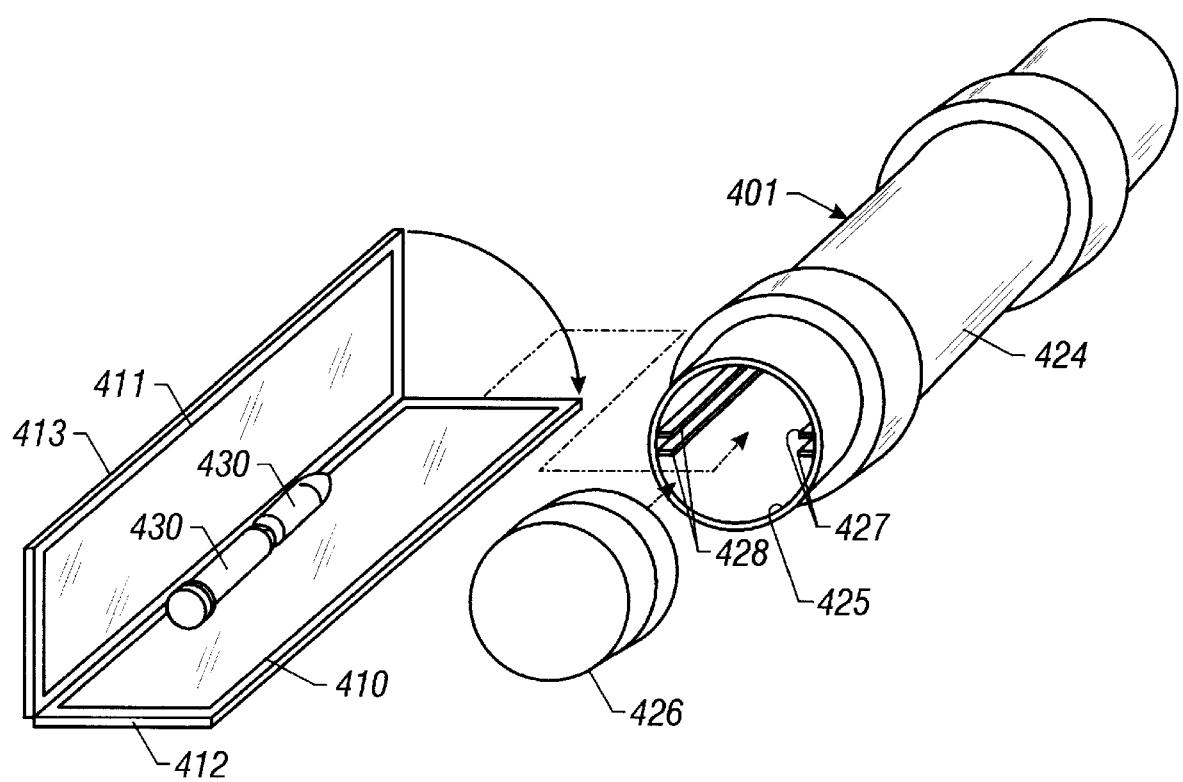
FIG. 12 is a perspective view of a pneumatic tube carrier showing a fifth embodiment of the present invention.

FIG. 12 shows a fifth embodiment of the present invention wherein modifications are made to the container of the second embodiment explained above. Referring to FIG. 12, the container body 401 of the fifth embodiment is comprised of a cylindrical-shaped first outer shell or body 424 having an opening 425 formed at one end in the longitudinal direction and a second outer shell or lid 426 having an opening (not shown) and attached to the opening 425 of the first outer shell 424. The peripheries of the pair of elastic films 410 and 411 are affixed to the pair of frames 412 and 413 having the same configuration as in the second embodiment. Guide rail-like holders 427 and 428 are provided for detachably holding the two sides of the pair of frames 412 and 413 at the inside surface of the first outer shell 402.

Accordingly, even in the fifth embodiment, by inserting the articles 430 between the pair of elastic films 410 and 411, superposing the pair of frames 412 and 413 over each other, placing the assembly in the first outer shell 424, and making the holders 427 and 428 hold it, it is possible to easily carry in the container body 401 articles having various shapes and/or sizes and possible to convey the articles 430 through a pneumatic tube while effectively protecting them from vibration and shock.

While the above explanation was made with reference to the illustrated embodiments, the present invention is not limited to just the above embodiments. For example, the cross-sectional shapes of the container body, inner case, etc. are not limited to circular ones and for example may be elliptical, oval, square, etc. Further, the articles shown are only illustrations.

As clear from the above explanation, according to the present invention, it is possible to provide a pneumatic tube carrier which can easily carry articles of various shapes and/or sizes and can convey the articles through a pneumatic tube while protecting them from shock.

We claim:

1. A pneumatic tube carrier for containing at least one article and conveying said at least one article through a pneumatic tube, the pneumatic tube carrier comprising:

a container body for carrying said at least one article; and a pair of elastic films provided in the container body with peripheries thereof held by the container body, the pair of elastic films holding said at least one article in the container body.

2. A pneumatic tube carrier as set forth in claim 1 wherein the container body includes a first outer shell having an opening and a second outer shell having an opening matching with the opening of the first outer shell, the peripheries of the pair of elastic films being affixed to the first and second shells around the openings, respectively.

3. A pneumatic tube carrier as set forth in claim 1 further comprising a pair of frames attached in a detachable manner at predetermined positions in the container body, wherein the peripheries of the pair of elastic films are affixed to the pair of frames.

4. A pneumatic tube carrier as set forth in claim 3 wherein the container body comprises a first outer shell having an opening and a second outer shell having an opening matching with the opening of the first outer shell, the openings of the first and second outer shells having holders for holding the pair of frames.

5. A pneumatic tube carrier as set forth in claim 1 wherein at least parts of the container body and the elastic films are transparent or semitransparent.

6. A pneumatic tube carrier as set forth in claim 1 further comprising an inner case carried in the container body, the inner case comprising a first inner shell having an opening and a second inner shell having an opening matching with the opening of the first inner shell, the peripheries of the pair of elastic films being attached to the first and second inner shells around the openings, respectively.

7. A pneumatic tube carrier as set forth in claim 6 wherein at least parts of the container, the inner case, and the elastic films are transparent or semitransparent.

8. A pneumatic tube carrier as set forth in claim 6 wherein the first and second inner shells are pivotally connected to each other at one side of the openings for open and close movement thereof.

9. A pneumatic tube carrier for containing at least one article and conveying said at least one article through a pneumatic tube, the pneumatic tube carrier comprising:

a container body for carrying said at least one article; and an elastic film provided in the container body with a periphery thereof held by the container body, the elastic film being adapted to be stretched by said at least one article placed in the container body.

10. A pneumatic tube carrier as set forth in claim 9 wherein the container body comprises a first outer shell having an opening and a second outer shell having an opening matching with the opening of the first outer shell, the periphery of the elastic film being attached to one of the first and second outer shells around the opening of the corresponding outer shell.

11. A pneumatic tube carrier as set forth in claim 2 or 10 wherein the first and second outer shells are pivotally connected to each other at one side of the openings for open and close movement thereof.

12. A pneumatic tube carrier as set forth in claim 9 wherein at least parts of the container body and the elastic film are transparent or semitransparent.

* * * * *